United States Patent [19]

Suzuki et al.

[11] Patent Number: 5,471,856
[45] Date of Patent: Dec. 5, 1995

[54] BENDING PROCESSING METHOD AND APPARATUS THEREFOR

[75] Inventors: Masatoshi Suzuki; Hajime Kuga, both of Chiba, Japan

[73] Assignee: Kinugawa Rubber Ind. Co., Ltd., Chiba, Japan

[21] Appl. No.: 189,085

[22] Filed: Jan. 28, 1994

[30] Foreign Application Priority Data

Jan. 29, 1993 [JP] Japan .................... 5-013636

[51] Int. Cl.⁶ ................................. B21D 31/06
[52] U.S. Cl. ...................... 72/1; 72/7; 72/403; 72/413
[58] Field of Search ................ 72/413, 396, 397, 72/403, 311, 312, 7, 22, 1

[56] References Cited

U.S. PATENT DOCUMENTS

| | | | |
|---|---|---|---|
| 238,934 | 3/1881 | Lewis | 72/397 |
| 1,776,082 | 9/1930 | Peterson | 72/413 |
| 3,511,073 | 5/1970 | Williamson | 72/403 |
| 4,212,188 | 7/1980 | Pinson | 72/413 |

FOREIGN PATENT DOCUMENTS

| | | | |
|---|---|---|---|
| 76937 | 3/1993 | Japan | 72/396 |
| 766706 | 9/1980 | U.S.S.R. | 72/413 |
| 1147471A | 3/1985 | U.S.S.R. | |
| 821681 | 10/1959 | United Kingdom | |

Primary Examiner—Daniel C. Crane
Attorney, Agent, or Firm—Bachman & LaPointe

[57] ABSTRACT

A bending processing apparatus includes upper and lower molds made of a flexible synthetic resin material which are interposed between end surfaces of a plurality of driven cylinders opposing a corresponding plurality of movable cylinders. This arrangement is mounted on a base stand and an article to be subjected to bending processing is supported by pressure between the upper and lower molds. A control unit is provided for controlling a stroke amount, stroke order and speed of the respective cylinders such that pressing force may be uniformly obtained during bending processing, thus wrinkling or finding in the article during processing is prevented.

17 Claims, 8 Drawing Sheets

5,471,856

BENDING PROCESSING METHOD AND APPARATUS THEREFOR

BACKGROUND OF THE INVENTION

1. Field of the Invention

The present invention relates generally to a bending apparatus for bending weatherstripping, core bars of weatherstrips, or the like.

2. Description of the Related Art

As is well known, a core bar, which is embedded in solid rubber for forming weatherstrips, is subjected to bending processing beforehand in accordance with a shape of a vehicle body opening portion to be covered by the weatherstrip. Conventionally, a stretch bending system, a draw bending system and a press bending system are well known.

However, according to the stretch bending system, terminal portions of the core bar, or weatherstrip must be clamped before effecting bending processing, the clamped ends being discarded after processing such that wastage of material and additional labour required become drawbacks of this process.

According to the draw bending method, it is possible to effect bending of weatherstripping into various shapes by replacing appropriately shaped wheels of varying sizes according to the shape desired. However, according to this method, only two-dimensional shapes are available, which may be insufficient for modern processing requirements.

According to the press system, as for example shown in FIG. 8, a straight piece of core bar 2 is set across an appropriately shaped mold groove 1a of a lower mold 1 while an upper mold 3 having a reciprocally shaped mold projection 3a is lowered into the core bar 2 to effect bending operation. However, according to such press system bending processing, springback may occur to the article (i. e. the core bar 2) after processing such that the article may parially resume its orignal shape. Thus, such occurence of springback must be taken into consideration in the shape of the mold and additional engineering complexity and increased costs are incurred.

Also, according to press type bending processing, when the upper and lower molds 3, 2 are brought together, the molding pressure therebetween as applied to the core bar 2 is uneven along the length of the core bar 2. Thus, particularly when a length of rubber weatherstripping is fitted over the core bar to be processed, such non-uniform molding pressure may cause folds and/or wrinkles in the finished article or mahy otherwise and may marr the finished appearance and/or performance of the finished article.

Therefore it has been required to provide a bending processing apparatus which can apply substantially uniform pressure during molding and which can effect a wide range of bending operations without need of mold replacement or substantial retooling.

SUMMARY OF THE INVENTION

It is therefore a principal object of the present invention to overcome the drawbacks of the related art.

It is a further object of the present invention to provide bending apparatus which can apply substantially uniform pressure during molding and which can effect a wide range of bending operations without need of mold replacement or substantial retooling.

In order to accomplish the aforementioned and other objects, a bending apparatus is provided, comprising: a plurality of first pressing members arranged in a lateral row and movable in first and second directions along parallel axes; a plurality of second pressing members arranged in lateral row corresponding to the plurality of first pressing members and axially aligned therewith respectively such that ends of the second pressing members face ends of the first pressing members; a first flexible mold retained along ends of the first pressing members; a second flexible mold arranged facing the first mold, retained along ends of the second pressing members; driving means active for driving the first pressing members in the first or second directions at a controlled speed; resistance means active to regulate movement of the second pressing members according to contact by the first pressing members moving in the first direction; control means active to control the driving means so as to drive the first pressing members in the first direction against ends of the second pressing members so as to establish a uniform clamping pressure between the first and second molds lengthwise therealong, the control means then being active to initiate bending operation by controlling the the lateral rows of first and second pressing means to further move in the first direction at the controlled speed while maintaining the clamping pressure, outermost ones of the first and second pressing means being urged to move first followed by inwardly adjacent ones of the first and second pressing means being sequentially controlled to move such that movement of a center one of the first and second pressing means is performed last, a degree of movement of each of the pressing means in the first direction being determined in accordance with data provided to the control means.

According to another aspect of the invention, a bending processing method, wherein an article to be subjected to bending processing is retained between first and second molds is provided, comprising: moving a first flexible mold at a controlled speed in a first direction via a lateral row of first pressing members moving along parallel axes; contacting the first flexible mold with a second flexible mold, supported by a lateral row of second pressing members axially aligned with and corresponding to a number of the first pressing members, so as to establish a clamping pressure between the first and second flexible molds; and controlling outermost ones of the first and second pressing means to further move in the first direction, followed by inwardly adjacent ones of the first and second pressing means sequentially such that movement of a center one of the first and second pressing means is performed last, the movement being carried out at the controlled speed while maintaining the clamping pressure between the first and second flexible molds.

DESCRIPTION OF THE PREFERRED EMBODIMENT

Figure 1:
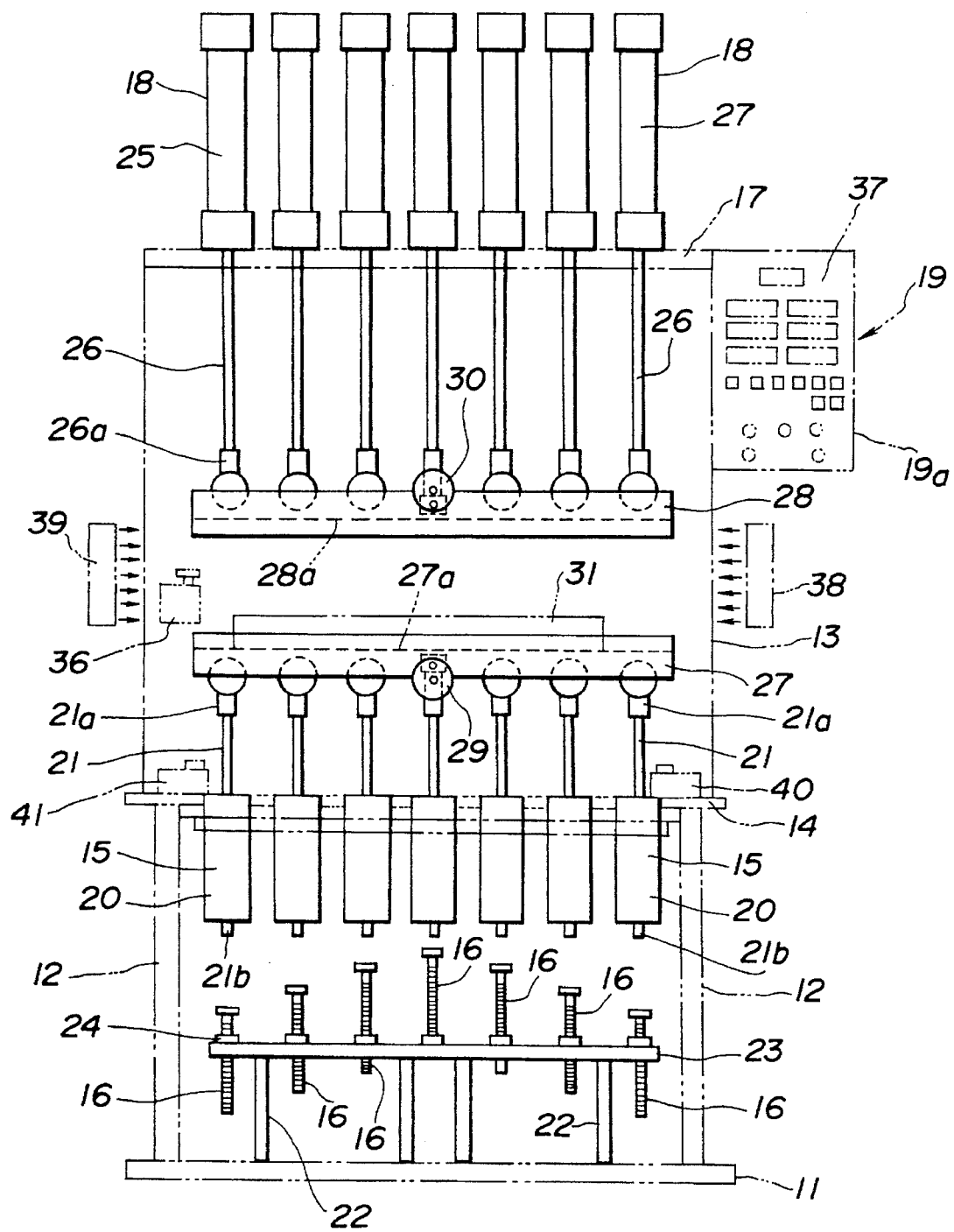
FIG. 1 is a schematic view of a bending processing apparatus according to a preferred embodiment of the invention.

Referring now to the drawings, particularly to FIG. 1, a first preferred embodiment of a bending apparatus according to the invention will be described hereinbelow in detail.

A bending apparatus 1 according to the present embodiment includes a base stand 11, a substantially box-shaped support leg 12 fixed on the base stand 11 and a support frame 12 attached to an upper plate 14 of the support leg 12. At a lower side of the upper plate 14, a plurality of driven cylinders 15 are vertically arranged in a single lateral row. At an upper side of the base stand 11, below the driven cylinders 15, a corresponding plurality of stopper members 16 are aligned. In addition, a roof plate 17 supporting a plurality of movable cylinders 18 is provided at an upper side of the support frame 18. The movable cylinders 18 are vertically aligned in a lateral row such that one of the movable cylinders 18 opposes one of the driven cylinders 15 respectively.

A control unit 19 is provided to control vertical movement (up and down movement) of the movable and driven cylinders.

Each of the driven cylinders 15 comprises a cylinder tube 20 through which a piston rod 21 extends. An upper side of the cylinder tube 15 is mounted in an opening provided in the upper plate 14. End portions 21a and 21b are provided at upper and lower sides of the piston rod 21 respectively. Also, although not shown in the drawings, a piston is provided within the cylinder tube, partitioning the cylinder tube 20 into two chambers (not shown). The piston is movable within the cylinder tube 20 via air pressure, for example, for moving the piston rod 21 in upper and lower vertical directions.

Each of the stopper members 16 is formed essentially as a screw threaded though a support plate 23 such that a position of an upper end of each stopper member 16 may be determined independently according to how far through the support plate the stopper member has been threaded, as seen in FIG. 1. The upper end of the stopper members 10 are coaxially aligned with the lower end portions 21b of the piston rods. Further, a nut 24 is provided for each stopper member for setting a stopping position thereof. Generally, a middle one of the stopper members 16 being set to the highest position while the stopper members 16 on either side thereof being set in lower positions.

It will be noted that, according to the present embodiment, seven movable cylinders, seven driven cylinders and seven stopper members are provided. However, according to the invention, a greater or lesser number of these components may also be preferably utilized.

Each of the movable cylinders 18 comprises a cylinder tube 25 through which a piston rod 26 extends. An lower side of the cylinder tube 25 is mounted in an opening provided in the roof plate 17. An end portion 26a is provided at the lower side of the piston rod 26. Although not shown in the drawings, a piston is provided within the cylinder tube 26, partitioning the cylinder tube 26 into two chambers (not shown). According to the present embodiment, the piston is movable within the cylinder tube 26 via relative oil pressure in the upper and lower chambers (not shown), for moving the piston rod 21 in upper and lower vertical directions.

A lower mold 27 is provided on upper end portions 21a of the piston rods 21 of the driven cylinders 15, while an upper mold 28, opposing the lower mold 27 is provided on lower end portions 26a of the piston rods 26 of the movable cylinders 18. The upper and lower molds 28 and 27 may be substantially retangular in longitudinal cross-section while each of the upper and lower molds 28 and 27 have mold grooves 28a and 27a respectively, of a predetermined cross-sectional shape for retaining an article 31 (i.e. a weatherstrip) to be subjected to bending processing. The lower side of the lower mold 27 and the upper side of the upper mold 28 are provided with linking mechanism 29 and 30 for linking with the ends of the piston rods. The linking mechanisms 29, 30 may include a flange and a pivot shaft or the like. It will be noted that the left and right end portions of the upper and lower molds 28, 27 are not engaged by the linking mechanisms 30, 29.

Figure 2:
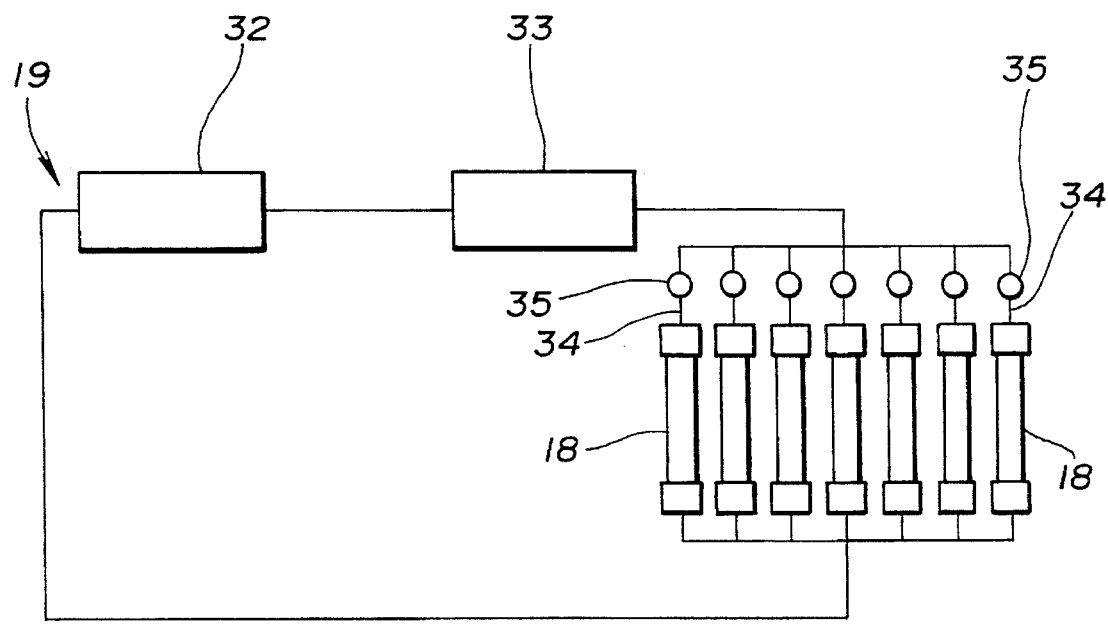
FIG. 2 is a block diagram of a portion of a control circuit according to the invention.

Referring now to FIG. 2, the control unit 19 includes a microcomputer 32 provided inside a distributor box 19a. The microcomputer 32 controls an oil pump 33 as well as electromagnetic control valves 35, 35 . . . which are provided in pranched oil passages 34, 34 . . . between the oil pump 33 and the cylinder tubes 25, 25 . . . of the movable cylinders 18. The microcomputer 32 adjusts a discharge pressure of the oil pump 33 by controlling a pump motor (not shown) so as to individually control a stroke speed of each of the piston rods 26, 26 . . . and controls an opening and closing timing of each of the electromagnetic control valves 35 by sequential control so as to individually control a stroke amount and stroke order of each of the piston rods 26.

In addition the control unit 19 controls a solenoid valve 36 through via the microcomputer 32 so as to individually control an air pressure of each of the driven cylinders 15, 15 . . . at a pressure selected with respect to an pressure supplied to the above-mentioned movable cylinders 18, 18 . . . .

At the distributor box 19a a stoke amount display panel 37 may be provided for monitoring the movable cylinders 18. In addition, a 'restore= button for returning the bending apparatus to an initial condition thereof, a pilot lamp, a main switch, an operation lamp, a operational preparation button, a warning lamp for signalling abnormal operating conditions and a manual automatic changeover switch may also preferrably be provided.

In addition, at right and left sides of the support plate 14, photoelectric tubes 38, 39 are provided which may be connected to an automatic shut off circuit or the like for assuring operator safety. Also, start buttons 40, 41 of a type which require simultaneous operation for switching on, may be preferably provided.

Hereinbelow a bending processing method according to the invention and corresponding to operation of the bending apparatus as described above will be explained in detail with reference to FIGS. 3–7.

Figure 3:
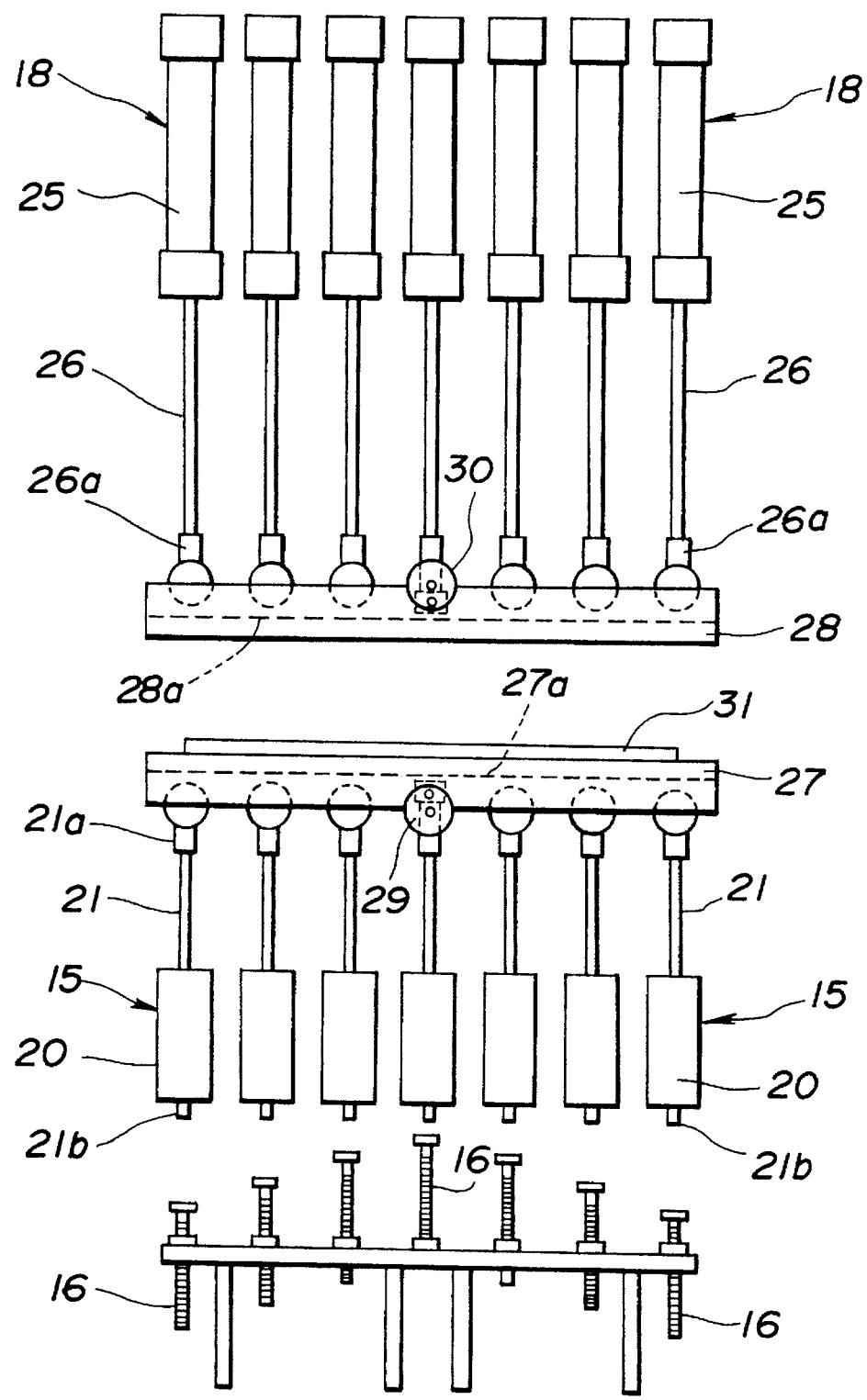
FIG. 3 is an explanatory view showing an initial step in bending processing according to the preferred embodiment.

First, appropriate instructions are input to the microcomputer 32 of the control unit 19 to effect bending of a length of weatherstrip 31 into, for example, an arc shape, and the weather strip 31 is set into the mold groove 27a of the lower mold 27. Thus, an initial position as shown in FIG. 3 is established.

Figure 4:
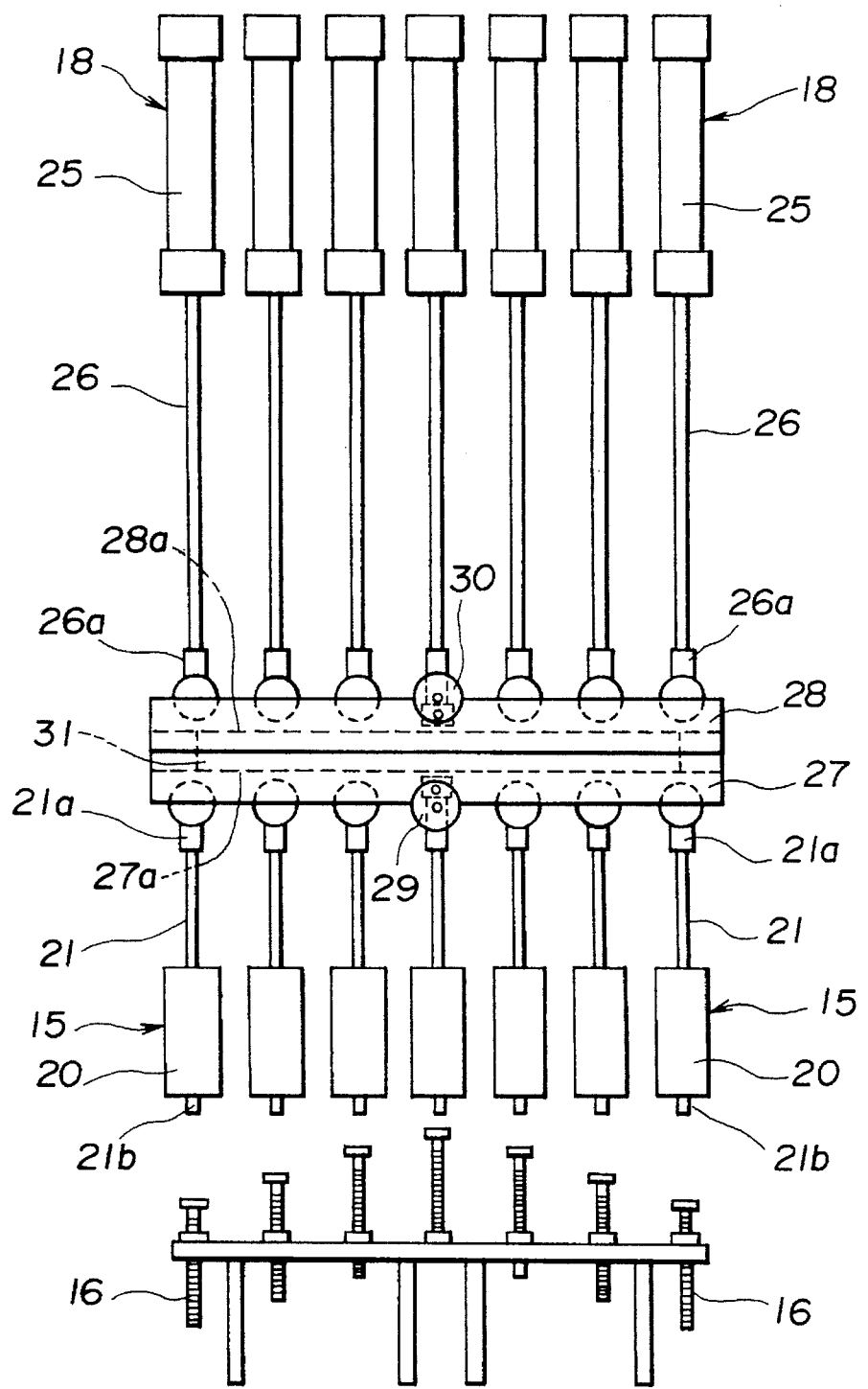
FIG. 4 shows a second step in bending processing according to the preferred embodiment.

Upon depression of the start buttons 40, 41, the control unit 19, via the microcomputer 32 performs lengthening, or decending movement of the piston rods 26 of the movable cylinders 18. As can be seen in FIG. 4, the piston rods 26 are urged to move at identical stroke amounts and speed until the upper mold 28 abuts the length of weatherstrip 31 and 'mold clamping' is performed wherein the weatherstrip 31 is tightly held between the lower and upper molds 27 and 28.

Figure 5:
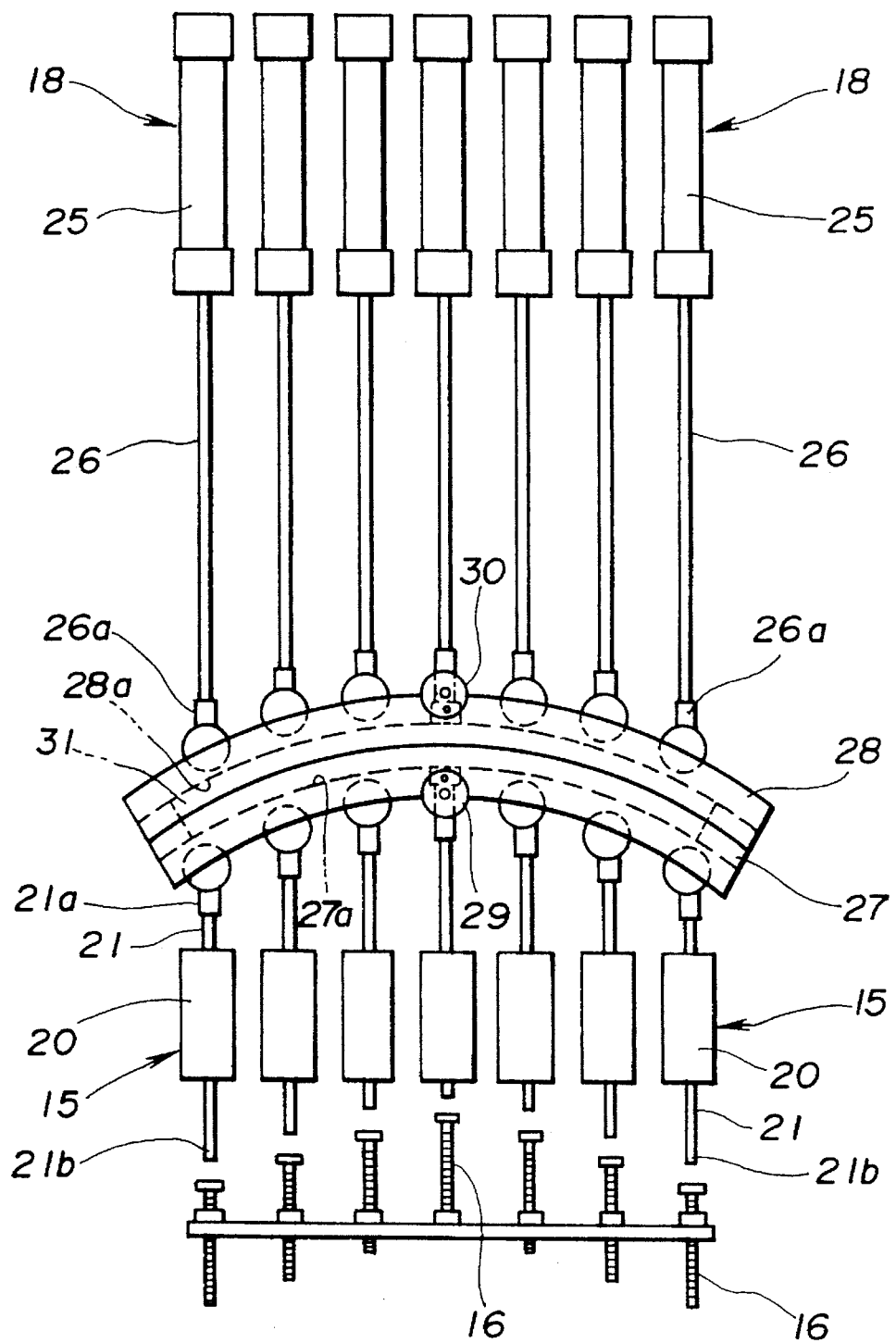
FIG. 5 shows a third step in bending processing according to the preferred embodiment.

Referring now to FIG. 5, the endmost piston rods 26, 26 at left and right sides of the lateral line of movable cylinders 18 are urged to move downward while the mold clamping state is maintained. Subsequently, the piston rods 26 adjacently inward of the endmost piston rods 26 are sequentially urged downward, the centermost piston rod being moved last. Stroke length and speed of the piston rods 26 being controlled according to the instructions input to said microcomputer. Concurrently with this operation, the air pressure in each of the driven cylinders 15 is regulated such that corresponding decending motion of the piston rods 21 of the driven cylinders 15 is effected, with decending motion of the centermost driven cylinder 15 being effected last.

Thus, the upper and lower molds are bent into the required arc shape by the presing force of the piston rods 26, 26 . . . and 21, 21 . . . , as seen in FIG. 5. During this processing, the movable cylinders 18 and the driven cylinders 15 apply uniform pressure to both of the upper and lower molds 28, 27, which is the same as the force of the mold clamping established at the beginning of bending processing. Thus, the weatherstrip is subjected to bending processing gradually, starting and end portions thereof.

Figure 6:
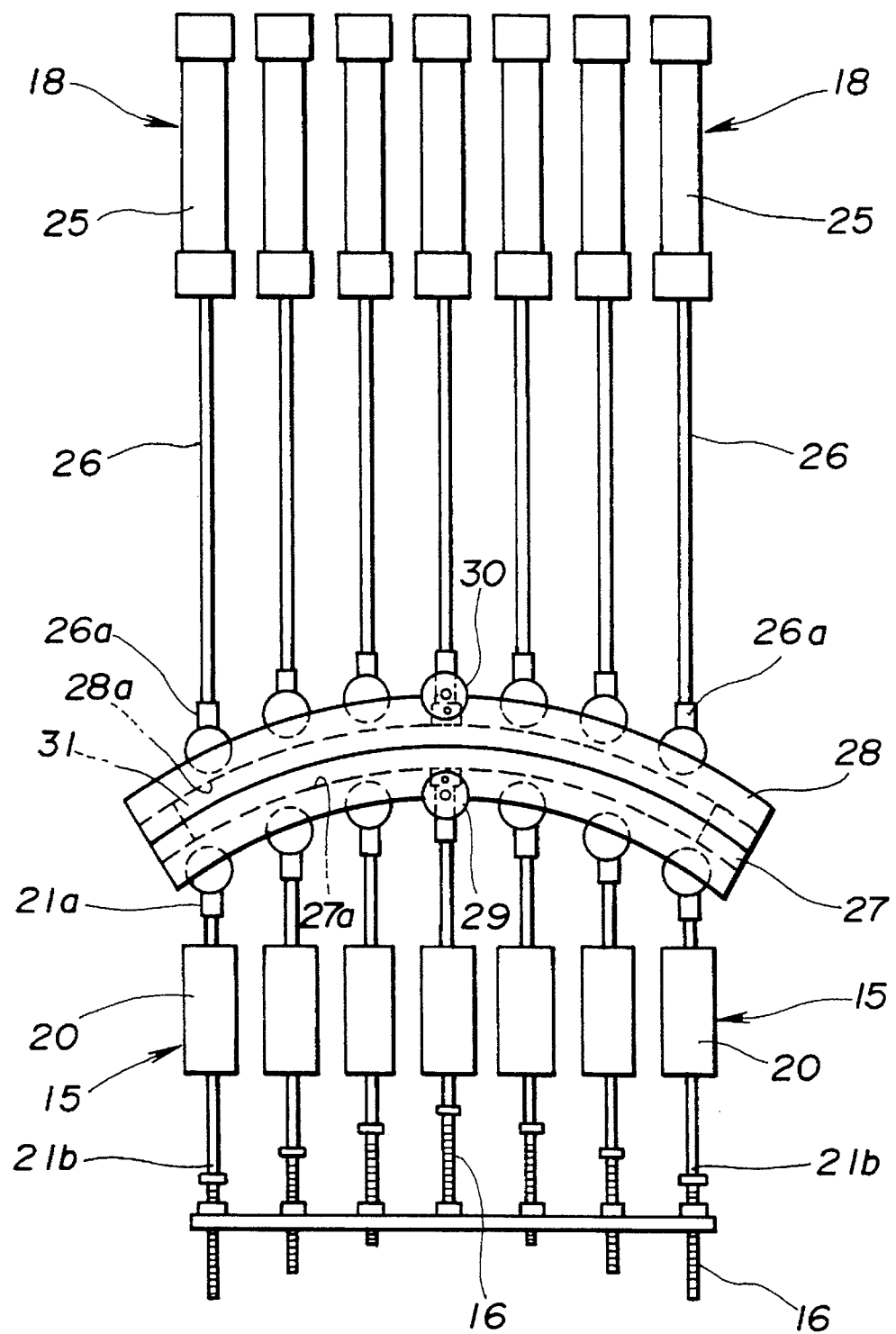
FIG. 6 shows a forth step in the same bending processing operation.

Further, as explained above, during processing, the piston rods 26, 21 are driven to decend at identical stroke lengths and stroke speeds. Referring to FIG. 6, decending operation of the piston rods 26, 21 is continued until the lower end portions 21b of the piston rods 21 of the driven cylinders 15 abut the upper ends of the stopper members 16, thus halting further bending operation. At the time when the lower end portions 21b of the piston rods 21 abut the stopper members 16, the upper and lower molds 28, 27 are pressed even move strongly together, thefore the weatherstrip is strongly and certainly processed into the predetermined arc shape.

Figure 7:
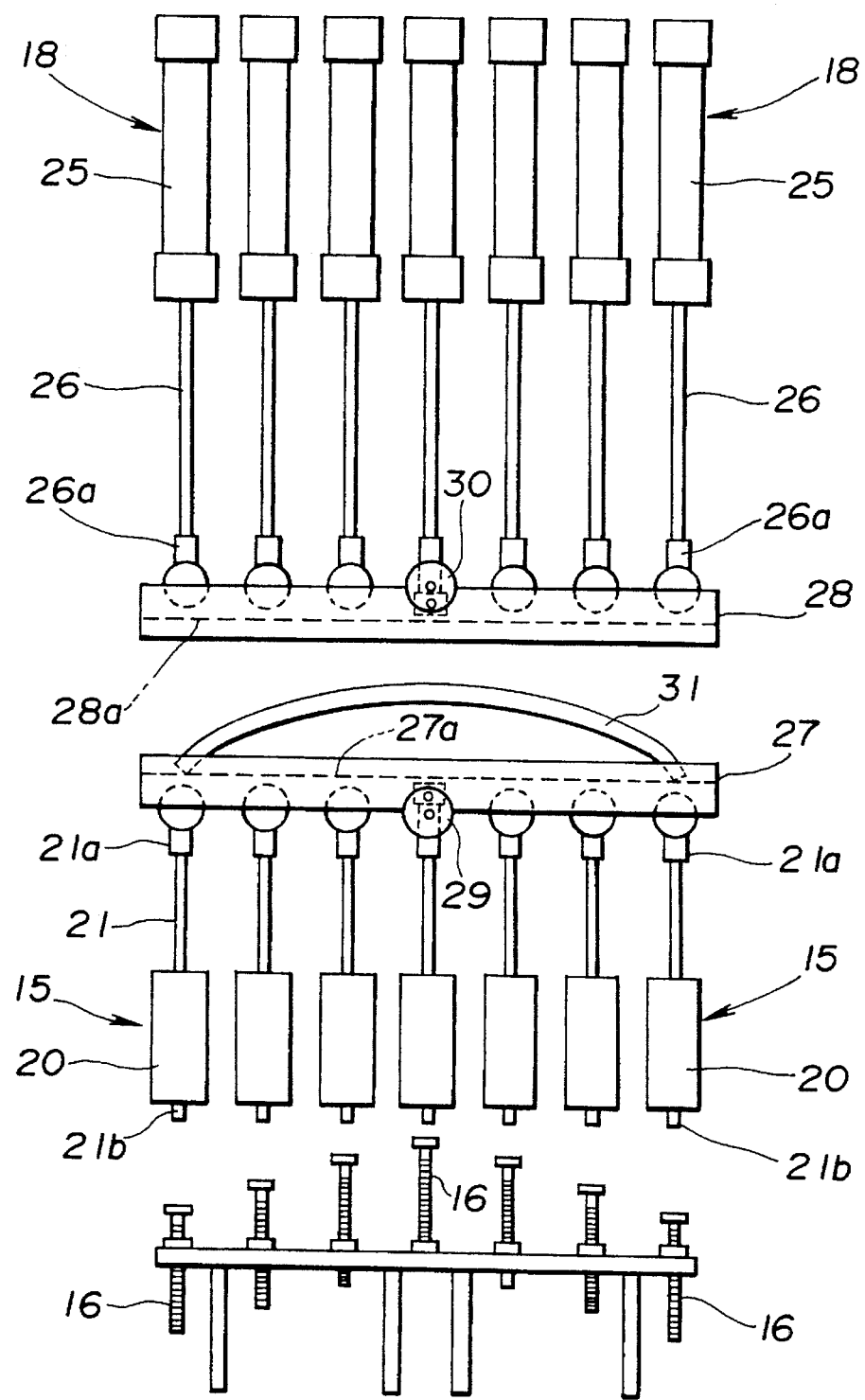
FIG. 7 shows a fifth step in the bending processing operation of FIGS. 3–6.
Figure 8:
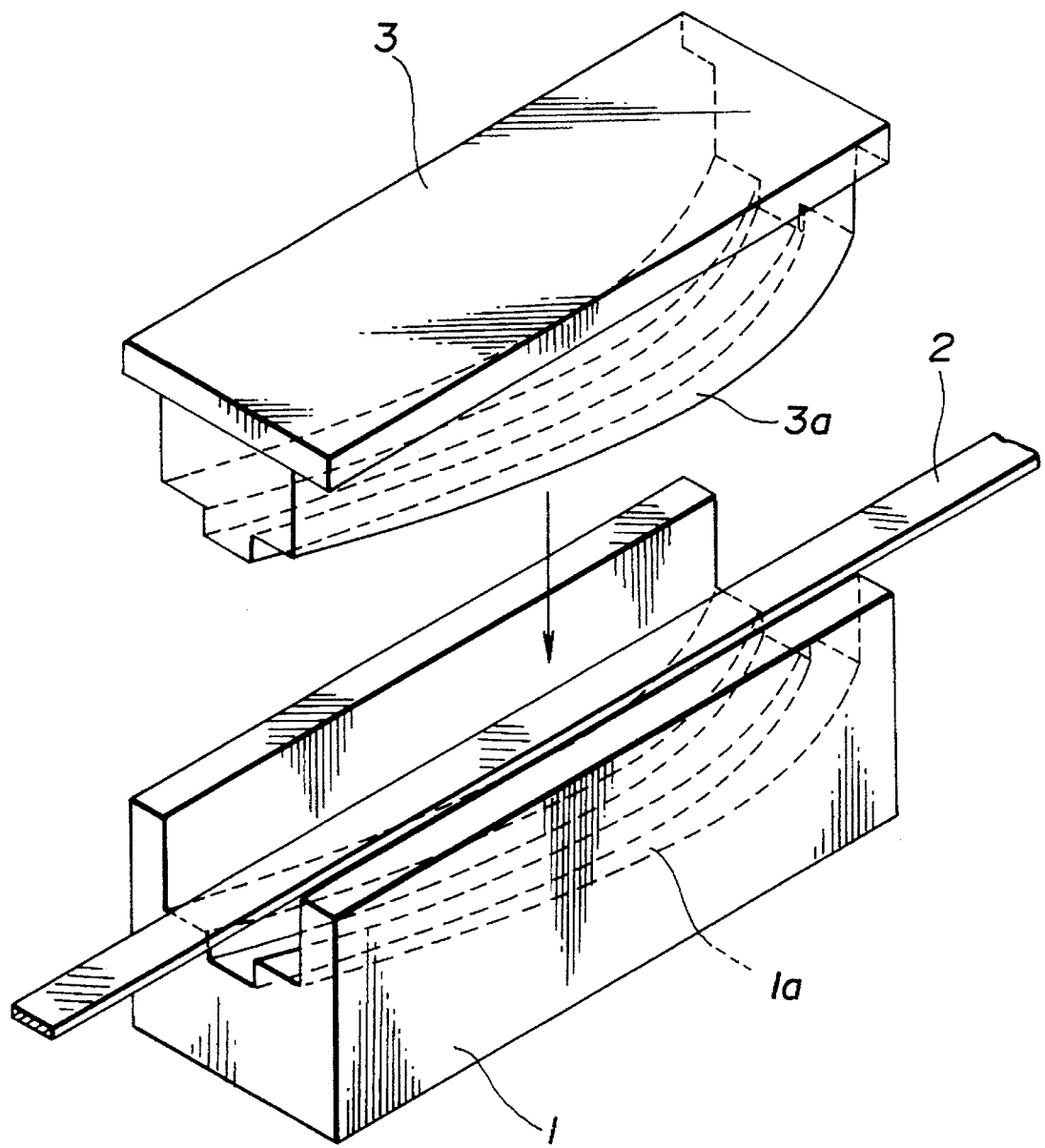
FIG. 8 is an perspective view of one type of conventional bending processing apparatus.

Thereafter, as shown in FIG. 7, the movable cylinders 18 and the driven cylinders 15 are set to resume their inital positions causing the upper and lower molds 28, 27 to separate and exposing the processed length of weatherstrip 31, which is now bent into the desired arc shape.

The ascending and descending positions of the piston rods 21, 26 are detected by position sensors (not shown). According to this, the sensors register 'zero' until the mold clamping stage of bonding processing is established. The sensors then provide positional data on the positions of the piston rods 21, 26 to the microcomputer 32 of the control unit 19 during bending processing.

It will be noted that the upper and lower molds 28, 27 according to the present embodiment are formed of synthetic resin although they may also be preferrably formed of rubber, or spring steel. In addition, a core member, which may be of the same material as the upper and lower molds 28, 27 may be provided in the weatherstrip 31 for effecting two stage bending operations for forming three-dimensional shapes.

Of course, the positions of the stopper members 16 are adjustable according to a desired bending shape. Such adjustment may be effected manually or by servo motors or the like.

According to the above-described bending processing operation, since bending force acts uniformly on the entire article (the weatherstrip 31), wrinkling, folding, and the like is prevented and the weatherstrip is imparted a smooth attractive finish. Also, since the upper and lower molds 28, 27 are formed of flexible synthetic resin, pressing force is evenly dispersed and realization of uniform bending force is further promoted. Also, owing to the molds 27, 28 being formed of synthetic resin, manufacture and processing of the molds 27, 28 themselves becomes easy and low in cost.

According to the invention, the entire article may be subjected to bending processing without requiring clamping of end portions thereof, thus material waste is avoided and labour is reduced. Also, since the mold is firmly held between the movable cylinders 18 and the driven cylinders 15 at the terminal point defined by the stopper members 16, spring back of the article after processing is surely prevented.

In addition, it is possible to obtain a desired shape including three-dimensional bending only by changing a stroke amount and the stroke speed of the movable and driven cylinders 18, 15, thus, it becomes unnecessary to change the shape of the molds 27, 28 or perform scraping, etc. According to this, processing efficiency is significantly improved and drastic cost reduction is possible and the bending apparatus becomes widely useful for general applications.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A bending apparatus, comprising:

a plurality of first pressing members having at least a pair of outermost ones and a center one arranged in a lateral row and movable in first and second directions along parallel axes;

a plurality of second pressing members having at least a pair of outermost ones and a center one arranged in lateral row corresponding to said plurality of first pressing members and axially aligned therewith respectively such that ends of said second pressing members face ends of said first pressing members;

a first flexible mold retained along ends of said first pressing members;

a second flexible mold arranged facing said first mold, retained along ends of said second pressing members;

driving means active for driving said first pressing members in said first or second directions at a controlled speed;

resistance means active to regulate movement of said second pressing members according to contact by said first pressing members moving in said first direction;

control means active to control said driving means so as to drive said first pressing members in said first direction against ends of said second pressing members so as to establish a uniform clamping pressure between said first and second molds lengthwise therealong, said control means then being active to initiate bending operation by controlling the said driving means and the resistance means for selectively moving said lateral rows of first and second pressing means in said first direction at said controlled speed while maintaining said clamping pressure wherein said outermost ones of said first and second pressing means being urged to move first followed sequentially by inwardly adjacent ones of said first and second pressing means such that movement of said center one of said first and second pressing means is performed last whereby the degree of movement of each of said pressing means in said first direction is determined in accordance with data provided to said control means.

2. A bending apparatus as set forth in claim 1, wherein said first and second pressing means comprise a plurality of first and second fluid cylinders.

3. An bending apparatus as set forth in claim 1, wherein said first and second molds are formed of synthetic resin.

4. An bending apparatus as set forth in claim 1, wherein stopper members are provided for limiting a degree of travel of said second pressing means in said first direction.

5. An bending apparatus as set forth in claim 1, wherein an odd number of fluid cylinders comprises each of said lateral rows of first and second pressing means.

6. An bending apparatus as set forth in claim 2, wherein movement of said first fluid cylinders are controlled according to piston movement caused by relative oil pressure in first and second working chambers thereof and said second fluid cylinders are controlled according to piston movement caused by relative oil pressure in first and second working chambers thereof.

7. An bending apparatus as set forth in claim 1, wherein photoelectric monitoring means are provided in the vicinity of an area between said upper and lower molds at each side of said apparatus.

8. An bending apparatus as set forth in claim 7, wherein said photoelectric monitoring means is connected to an automatic shut-off circuit.

9. An bending apparatus as set forth in claim 1, wherein positional sensors are provided for each of said first pressing means, said positional sensors active to input positional data to said control means.

10. An bending apparatus as set forth in claim 1, wherein two start switches are provided, activation of both of said start switches being required to initiate bending processing operation.

11. An bending apparatus as set forth in claim 1, wherein said first and second molds are formed of rubber.

12. An bending apparatus as set forth in claim 1, wherein said first and second molds are formed of spring steel.

13. A bending processing method wherein an article to be subjected to bending processing is retained between first and second molds, comprising:

moving a first flexible mold at a controlled speed in a first direction via a lateral row of first pressing members having outermost ones and inwardly adjacent ones moving along parallel axes;

contacting said first flexible mold with a second flexible mold, supported by a lateral row of second pressing members having outermost ones and inwardly adjacent ones axially aligned with and corresponding in number to said first pressing members, so as to establish a clamping pressure between said first and second flexible molds; and selectively moving the outermost ones followed sequentially by the inwardly adjacent ones of said first pressing means against a controlled resistance applied to said second pressing means in said first direction wherein said outermost ones of said second pressing means are selectively displaced in said first direction followed sequentially by the inwardly adjacent ones such that movement of a center one of said first and second pressing means is performed last whereby the movement is carried out at said controlled speed while maintaining said clamping pressure between said first and second flexible molds.

14. An method as set forth in claim 13, further including the initial step of inputting control data specifying a degree of movement of each of said first and second pressing means in said first direction.

15. An method as set forth in claim 13, further including steps, after said controlling step, of resisting movement of said second pressing means such that movement and displacement of said first and second pressing means in said first direction is terminated and, applying finishing pressure higher than said clamping pressure between said first and second flexible molds.

16. An method as set forth in claim 15, further including a final step of moving said first and second pressing means in a second direction opposite said first direction to assume an inital position of said first and second pressing means.

17. A bending processing method wherein an article to be subjected to bending processing is retained between first and second molds, comprising:

moving a first flexible mold at a controlled speed in a first direction via a lateral row of first pressing members having outermost ones and inwardly adjacent ones moving along parallel axes;

contacting said first flexible mold with a second flexible mold, supported by a lateral row of second pressing members having outermost ones and inwardly adjacent ones axially aligned with and corresponding in number to said first pressing members, so as to establish a clamping pressure between said first and second flexible molds;

selectively moving the outermost ones followed sequentially by the inwardly adjacent ones of said first pressing means against a controlled resistance applied to said second pressing means in said first direction wherein said outermost ones of said second pressing means are selectively displaced in said first direction followed sequentially by the inwardly adjacent ones such that movement of a center one of said first and second pressing means is performed last whereby the movement is carried out at said controlled speed while maintaining said clamping pressure between said first and second flexible molds; and controlling parts of said first and second pressing members at which a bending displacement is relatively large to further move in said first direction, followed by adjacent parts of said first and second pressing members sequentially such that a movement of parts of said first and second pressing members at which the bending displacement is relatively small is performed last, said movement being carried out at said controlled speed while maintaining said clamping pressure between said first and second flexible molds.

* * * * *